(12) United States Patent  
Nagashima et al.

(10) Patent No.: US 10,520,668 B2  
(45) Date of Patent: Dec. 31, 2019

(54) METHOD FOR PRODUCING MULTICORE OPTICAL FIBER AND MULTICORE OPTICAL FIBER

(71) Applicant: SUMITOMO ELECTRIC INDUSTRIES, LTD., Osaka-shi, Osaka (JP)

(72) Inventors: Takuji Nagashima, Osaka (JP); Tetsuya Hayashi, Osaka (JP); Tetsuya Nakanishi, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 16/364,533

(22) Filed: Mar. 26, 2019

(65) Prior Publication Data
US 2019/0302356 A1 Oct. 3, 2019

(30) Foreign Application Priority Data
Mar. 28, 2018 (JP) .................................. 2018-061331

(51) Int. Cl.
*C03B 37/012* (2006.01)
*G02B 6/02* (2006.01)
(52) U.S. Cl.
CPC .... *G02B 6/02042* (2013.01); *C03B 37/01222* (2013.01); *C03B 37/01231* (2013.01); *G02B 6/02033* (2013.01)

(58) Field of Classification Search
None
See application file for complete search history.

(56) References Cited

U.S. PATENT DOCUMENTS

| 9,733,424 B2 | 8/2017 | Ishida et al. |
| 2016/0070058 A1* | 3/2016 | Nakanishi .......... G02B 6/02395 385/98 |

FOREIGN PATENT DOCUMENTS

JP H10-104443 A 4/1998

* cited by examiner

*Primary Examiner* — Chad H Smith
(74) *Attorney, Agent, or Firm* — Drinker Biddle & Reath LLP

(57) ABSTRACT

Provided is a method for producing a multicore optical fiber (MCF) in which variations in positions of cores relative to the outer shape of the MCF are small. The method includes: an integrating step of heating a common cladding tube and a core rods, thereby integrating the tube with the core rods to form a core-cladding composite body including a plurality of cores and a common cladding and having a noncircular cross-sectional shape; an outline detecting step of detecting the outline of the composite body; an optical fiber preform forming step of machining the outer circumferential surface of the composite body using results obtained in the outline detecting step to form the preform having a flat surface; and a drawing step of drawing one end of the preform under heating to obtain the MCF. Also provided is a MCF for which a rotation alignment operation is easily performed.

7 Claims, 19 Drawing Sheets

HOL ROTATION ANGLE OF CORE-CLADDING
COMPOSITE BODY θ [deg.]

METHOD FOR PRODUCING MULTICORE OPTICAL FIBER AND MULTICORE OPTICAL FIBER

BACKGROUND OF THE INVENTION

1. Field of the Invention

The present disclosure relates to a method for producing a multicore optical fiber and to a multicore optical fiber.

2. Description of the Related Art

One known optical fiber with increased channel capacity is a multicore optical fiber (MCF) having a plurality of cores. When two such MCFs are connected together, the cores of one of the MCFs must be aligned with the cores of the other MCF. Specifically, the center axes of the MCFs must be aligned with each other, and a rotational alignment operation must be performed. Since conventional MCFs have a circular cross section, the rotational alignment operation is time consuming.

To simplify the rotational alignment operation, MCFs having noncircular cross-sectional shapes have been proposed, and MCFs having flattened cross-sectional shapes are known. A method for producing a MCF having a flattened cross-sectional shape is described in FIG. 9 in Japanese Unexamined Patent Application Publication No. 10-104443. In this method, to produce the MCF having a flattened cross-sectional shape, a multicore optical fiber preform having a circular cross-sectional shape is ground to obtain a multicore optical fiber preform having a substantially rectangular cross-sectional shape.

SUMMARY OF THE INVENTION

The present invention relates to a method for producing a multicore optical fiber (MCF) including a plurality of cores extending in a longitudinal direction of the MCF and a common cladding that covers each of the plurality of cores. In a first aspect, the method includes: a glass rod machining step of machining an outer circumferential surface of a glass rod having a circular cross-sectional shape to form a flat surface; a glass rod drilling step of forming a plurality of core rod insertion holes extending in the longitudinal direction in the glass rod having the flat surface to produce a common cladding tube; a core rod inserting step of inserting core rods that are to become the plurality of cores into the respective plurality of core rod insertion holes; an integrating step of heating the common cladding and the core rods, thereby integrating the common cladding tube with the core rods to form a core-cladding composite body having a noncircular cross-sectional shape and including the plurality of cores and the common cladding; an outline detecting step of detecting an outline of the core-cladding composite body; an optical fiber preform forming step of machining an outer circumferential surface of the core-cladding composite body using results obtained in the outline detecting step to form an optical fiber preform having a flat surface; and a drawing step of drawing one end of the optical fiber preform under heating to obtain the MCF.

In a second aspect, the method includes: a glass rod drilling step of forming a plurality of core rod insertion holes extending in the longitudinal direction in a glass rod having a circular cross-sectional shape and forming a concave portion formation hole at a position different from positions of the plurality of core rod insertion holes to form a common cladding tube; a core rod inserting step of inserting core rods that are to become the plurality of cores into the respective plurality of core rod insertion holes; an integrating step of heating the common cladding tube and the core rods, thereby integrating the common cladding tube with the core rods and collapsing the concave portion formation hole to form a core-cladding composite body having a noncircular cross-sectional shape and including the plurality of cores and the common cladding; an outline detecting step of detecting an outline of the core-cladding composite body; an optical fiber preform forming step of machining an outer circumferential surface of the core-cladding composite body using results obtained in the outline detecting step to form an optical fiber preform having a flat surface; and a drawing step of drawing one end of the optical fiber preform under heating to obtain the MCF.

A MCF according to another aspect of the present invention includes: a plurality of cores extending in a longitudinal direction of the MCF; and a common cladding that covers each of the plurality of cores, wherein the MCF has a plurality of holes that have the same shape and are disposed such that each of the plurality of cores is located between corresponding two of the plurality of holes, the two of the plurality of holes being disposed at positions symmetric with respect to the each of the plurality of cores, and wherein the plurality of cores each have an elliptic cross-sectional shape.

DESCRIPTION OF THE PREFERRED EMBODIMENTS

In the method described in Japanese Unexamined Patent Application Publication No. 10-104443, the outer circumferential surface of the multicore optical fiber preform having a circular cross section is ground. However, it is difficult to grind the outer circumferential surface of the multicore optical fiber preform according to the positions of the cores because the positions of the cores cannot be measured accurately from the outside of the multicore optical fiber preform. Therefore, when multicore optical fibers (MCFs) produced by drawing multicore optical fiber preforms produced by the above method are connected together using the outer shape of the MCFs as a reference, misalignment of the cores may occur at the joint. When a rotational alignment operation is performed using the cores of the MCFs as a reference instead of their outer shape, the rotational alignment operation is still time consuming.

Preferred embodiments of the MCF of the present invention and the multicore optical fiber production method of the present invention will be described with reference to the drawings. In the following description, the same numerals in different figures represent the same elements, and the description thereof may be omitted. The present invention is not limited to examples in these embodiments and includes all changes that fall within the scope of the claims and their equivalents. When a plurality of embodiments can be combined, the present invention also includes any combination of the embodiments.

Examples of the MCF produced by the production method of the invention FIGS. 1A, 1B, 1C, and 1D are cross-sectional views showing MCFs 100A, 100B, 100C, and 100D produced by the production method of the present invention. The MCFs 100A, 100B, 100C, and 100D are made of glass and each include: a core group 110 composed of a plurality of cores 111 extending in a longitudinal direction and serving as optical waveguides; and a common cladding 120 that covers the core group 110. Each of the MCFs 100A, 100B, 100C, and 100D has a flat surface(s) 121. The "flat surface" as used herein is a surface having a larger radius of curvature than other portions. The flat surface 121 functions as a reference surface when MCFs are connected together.

Figure 1A:
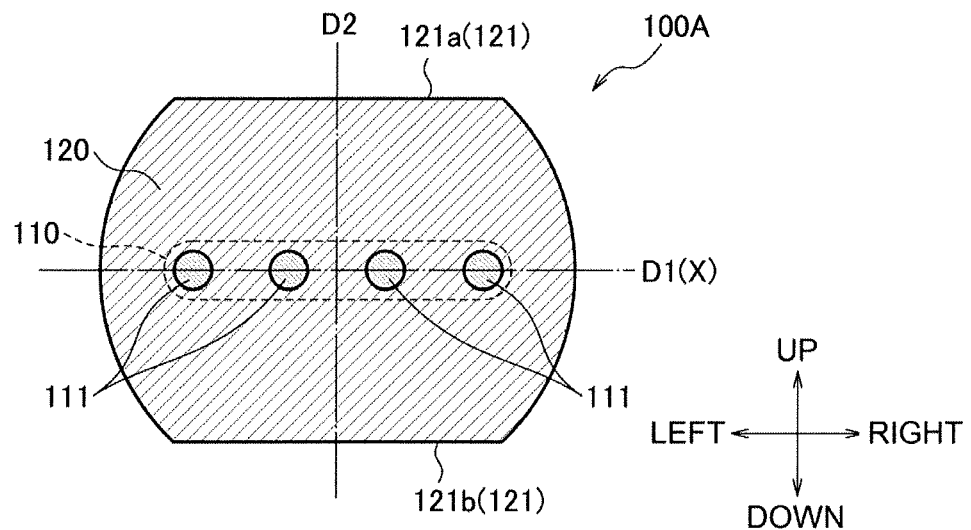
FIG. 1A is an illustration showing an example of the cross-sectional shape of a multicore optical fiber (MCF) produced by the production method of the present invention.

The common cladding 120 of the MCF 100A shown in FIG. 1A is line-symmetric with respect to a symmetry axis D1 extending in the left-right direction and to a symmetry axis D2 extending in the vertical direction. The common cladding 120 has, as the flat surfaces 121, an upper flat surface 121a and a lower flat surface 121b that are parallel to the symmetry axis D1. The cores 111 of the MCF 100A have a circular cross-sectional shape and are arranged in the common cladding 120 at regular intervals on a core arrangement axis X extending in the left-right direction. The core group 110 is positioned at the center in the vertical direction of the MCF 100A and at the center in the left-right direction. Therefore, the core arrangement axis X coincides with the symmetry axis D1 and is orthogonal to the symmetry axis D2. The upper flat surface 121a and the lower flat surface 121b are line-symmetric with respect to the core arrangement axis X.

Figure 1B:
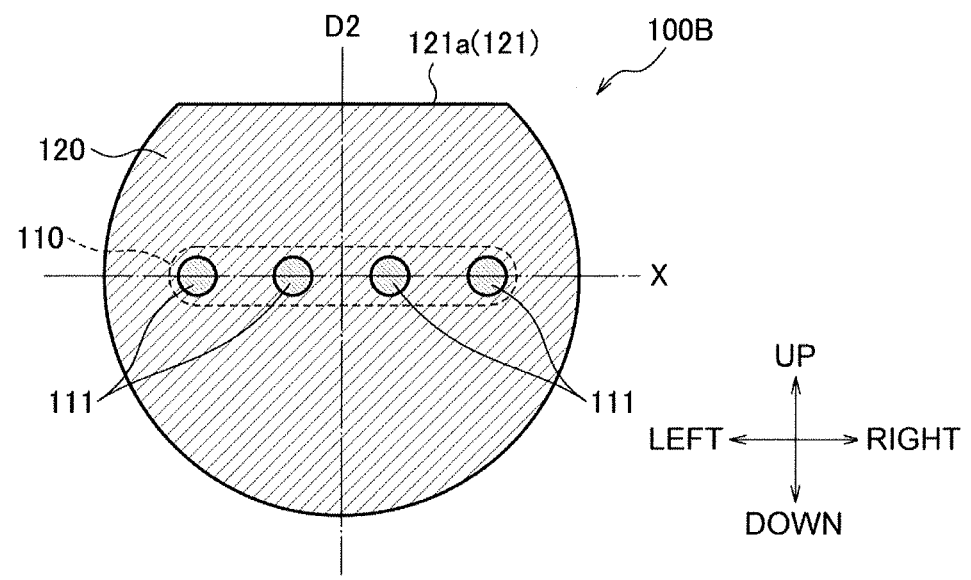
FIG. 1B is an illustration showing an example of the cross-sectional shape of a MCF produced by the production method of the present invention.

The common cladding 120 of the MCF 100B shown in FIG. 1B is line-symmetric with respect to a symmetry axis D2 extending in the vertical direction. The common cladding 120 has, as the flat surface 121, an upper flat surface 121a orthogonal to the symmetry axis D2. The cores 111 of the MCF 100B also have a circular cross-sectional shape and are arranged in the common cladding 120 at regular intervals on a core arrangement axis X. The core group 110 is positioned at the center in the left-right direction of the MCF 100B. The core arrangement axis X is parallel to the upper flat surface 121a.

Figure 1C:
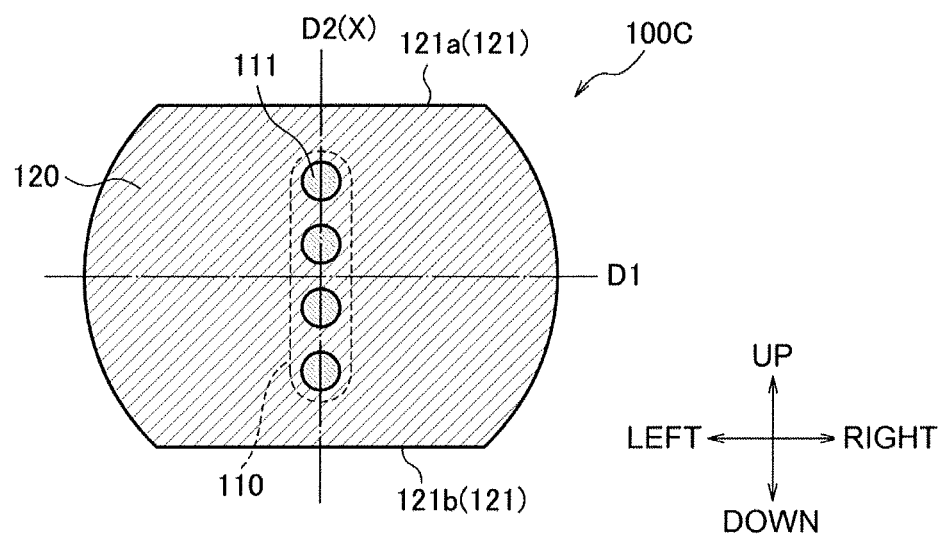
FIG. 1C is an illustration showing an example of the cross-sectional shape of a MCF produced by the production method of the present invention.

The common cladding 120 of the MCF 100C shown in FIG. 1C has the same outer shape as the common cladding 120 of the MCF 100A and has a symmetry axis D1 extending in the left-right direction and a symmetry axis D2 extending in the vertical direction. The common cladding 120 has, as the flat surfaces 121, an upper flat surface 121a and a lower flat surface 121b that are parallel to the symmetry axis D1. The cores of the MCF 100C also have a circular cross-sectional shape and are arranged in the common cladding 120 at regular intervals on a core arrangement axis X extending in the vertical direction. The core group 110 is positioned at the center in the vertical direction of the MCF 100C and at the center in the left-right direction of the MCF 100C. Therefore, the core arrangement axis X coincides with the symmetry axis D2. The core arrangement axis X is orthogonal to the upper flat surface 121a and the lower flat surface 121b.

Figure 1D:
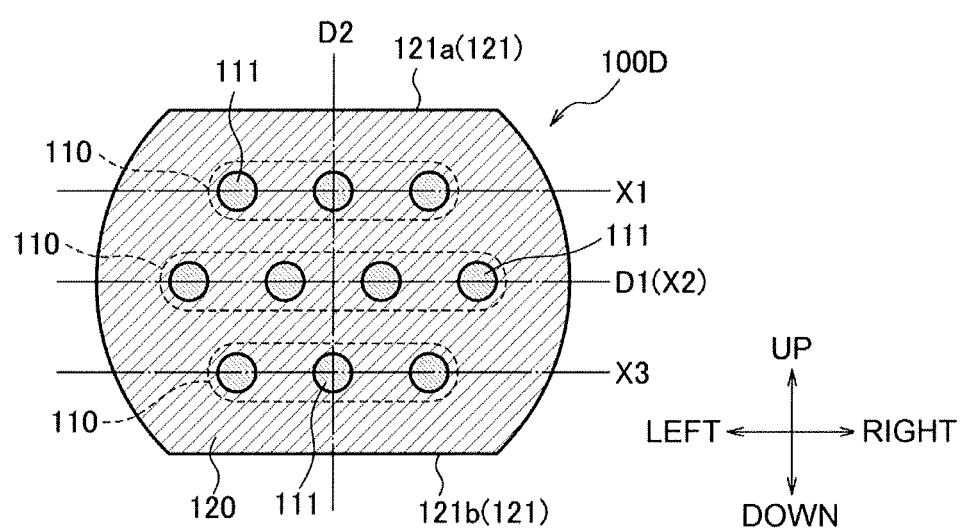
FIG. 1D is an illustration showing an example of the cross-sectional shape of a MCF produced by the production method of the present invention.

The common cladding 120 of the MCF 100D shown in FIG. 1D has the same outer shape as the common cladding 120 of the MCF 100A and has a symmetry axis D1 extending in the left-right direction and a symmetry axis D2 extending in the vertical direction. The common cladding 120 has, as the flat surfaces 121, an upper flat surface 121a and a lower flat surface 121b that are parallel to the symmetry axis D1. The cores 111 of the MCF 100D have a circular cross-sectional shape and are arranged so as to be symmetric with respect to the symmetry axis D1 and the symmetry axis D2. A plurality of core arrangement axes X1, X2, and X3 extending in the left-right direction in the common cladding 120 are parallel to each other and arranged at regular vertical intervals. Core groups 110 are arranged on the plurality of core arrangement axes X1, X2, and X3 at regular intervals. The core arrangement axis X2 coincides with the symmetry axis D1 and is orthogonal to the symmetry axis D2. The core arrangement axes X1, X2, and X3 are parallel to the upper flat surface 121a and the lower flat surface 121b.

The First Aspect of the Multicore Optical Fiber Production Method

Figure 2:
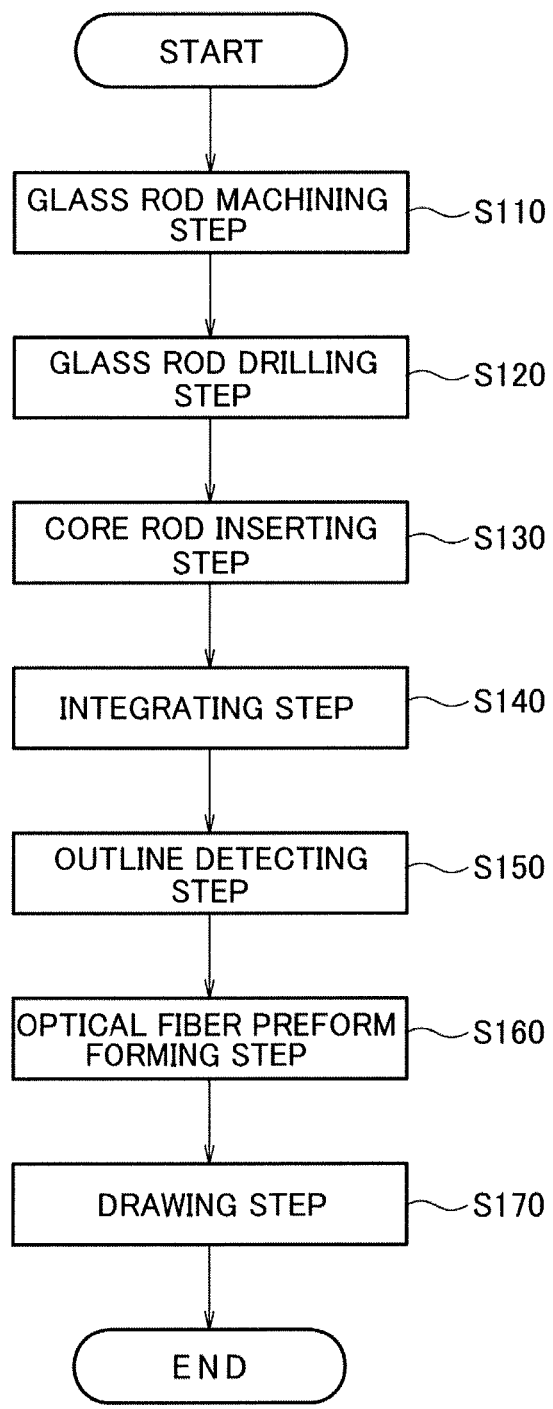
FIG. 2 is a flowchart showing the first aspect of the multicore optical fiber production method of the present invention.

FIG. 2 is a flowchart showing the first aspect of the multicore optical fiber production method of the present invention, and FIGS. 3A to 3F are cross-sectional views showing a member in different steps of the first aspect of the production method. The methods for producing the MCFs 100A, 100B, 100C, and 100D are basically the same. Therefore, the method for producing the MCF 100A will be described, and descriptions of the methods for producing the MCFs 100B, 100C, and 100D will be given as needed.

Figure 3A:
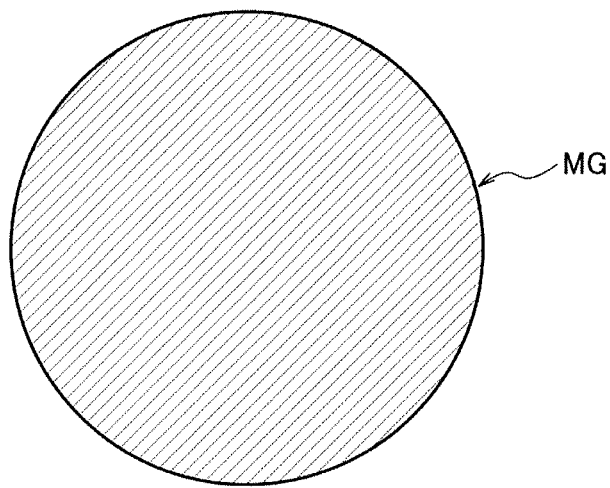
FIG. 3A is an illustration showing the cross-sectional shape of a member in the first aspect of the production method.
Figure 3B:
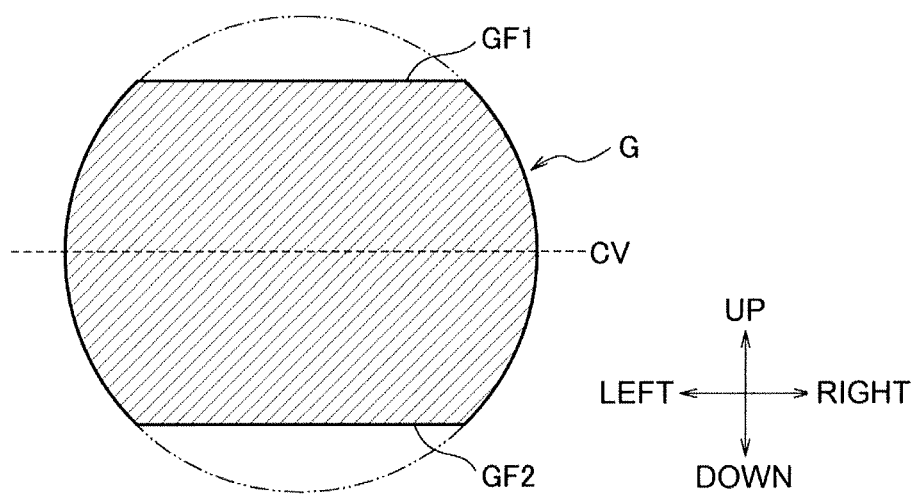
FIG. 3B is an illustration showing the cross-sectional shape of the member in the first aspect of the production method.

In the first aspect of the production method, first, a glass rod MG having a circular cross-sectional shape shown in FIG. 3A is prepared. The glass rod MG is machined in a glass rod-machining step S110 to obtain a glass rod G having an upper flat surface GF1 and a lower flat surface GF2 shown in FIG. 3B. As for the MCF 100B, only the upper flat surface GF1 is formed. The upper flat surface GF1 and the lower flat surface GF2 are parallel to each other. In this case, the glass rod G has a symmetry axis CV that does not intersect the upper flat surface GF1 and the lower flat surface GF2.

Figure 3C:
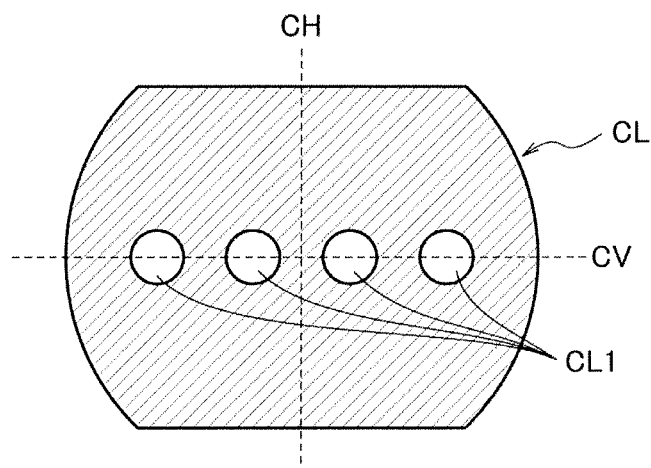
FIG. 3C is an illustration showing the cross-sectional shape of the member in the first aspect of the production method.

Next, in a glass rod drilling step S120, the glass rod G is machined to produce a common cladding tube CL shown in FIG. 3C. In the glass rod-drilling step S120, a plurality of core rod insertion holes CL1 having a circular cross-sectional shape and extending in the longitudinal direction of the common cladding tube CL are formed on the symmetry axis CV. In this case, the core rod insertion holes CL1 are formed at regular intervals so as to be line-symmetric with respect to a symmetry axis CH that intersects the upper flat surface GF1 and the lower flat surface GF2 of the common cladding tube CL (the glass rod G). Specifically, the arrangement direction of the core rod insertion holes CL1 is parallel to the upper flat surface GF1 and the lower flat surface GF2. In FIG. 3C, the number of core rod insertion holes CL1 is four but is not limited to four.

When the MCF 100C is formed, a plurality of core rod insertion holes CL1 having circular cross-sectional shapes are formed on the symmetry axis CH. In this case, the core rod insertion holes CL1 are formed at regular intervals so as to be line-symmetric with respect to the symmetry axis CV. The arrangement direction of the core rod insertion holes CL1 is orthogonal to the upper flat surface GF1.

When the MCF 100D is formed, the same procedure as in the case of the formation of the common cladding tube CL having the cross sectional shape of the MCF 100A is repeated, and then a plurality of core rod insertion holes CL1 are formed on a plurality of parallel axes spaced apart a certain distance from the symmetry axis CV. In this case, the core rod insertion holes CL1 are formed at regular intervals so as to be line-symmetric with respect to the symmetry axis CH. Specifically, the arrangement direction of the core rod insertion holes CL1 is parallel to the upper flat surface GF1 and the lower flat surface GF2.

Figure 3D:
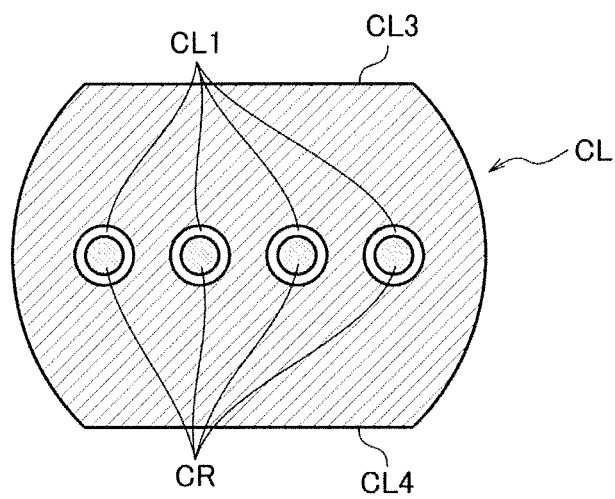
FIG. 3D is an illustration showing the cross-sectional shape of the member in the first aspect of the production method.

Next, in a core rod inserting step S130, core rods CR are inserted into the respective core rod insertion holes CL1 of the common cladding tube CL to obtain the state shown in FIG. 3D. The diameter of the core rods CR is smaller than the diameter of the core rod insertion holes CL1.

Figure 3E:
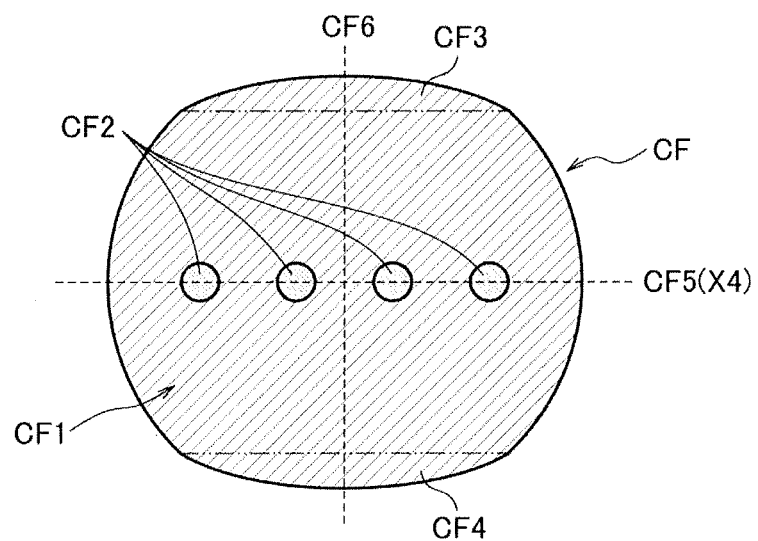
FIG. 3E is an illustration showing the cross-sectional shape of the member in the first aspect of the production method.

Next, in an integrating step S140, the common cladding tube CL with the core rods CR inserted thereinto is heated and integrated to produce a core-cladding composite body CF shown in FIG. 3E. The core-cladding composite body CF includes a common cladding CF1 and a plurality of cores CF2. In this case, the common cladding tube CL is heated and softened, so an upper flat surface CL3 and a lower flat surface CL4 of the common cladding tube CL deform to form an upper protruding portion CF3 and a lower protruding portion CF4.

Figure 3F:
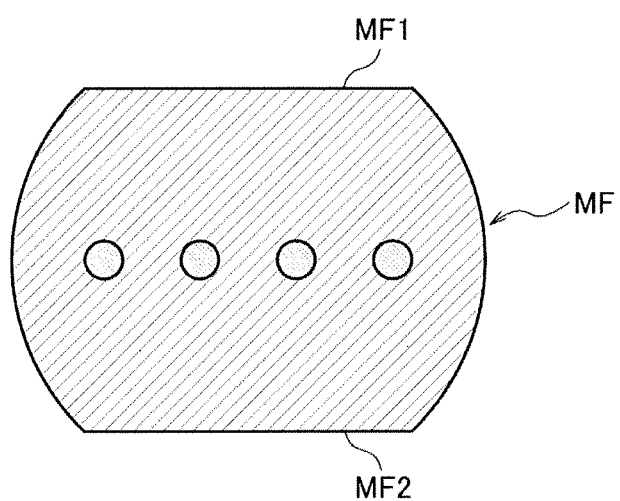
FIG. 3F is an illustration showing the cross-sectional shape of an optical fiber preform in the first and second aspects of the production method.

Next, in an outline detecting step S150 and an optical fiber preform forming step S160, the outer circumferential surface of the core-cladding composite body CF is machined to produce a multicore optical fiber preform MF shown in FIG. 3F.

Figure 4A:
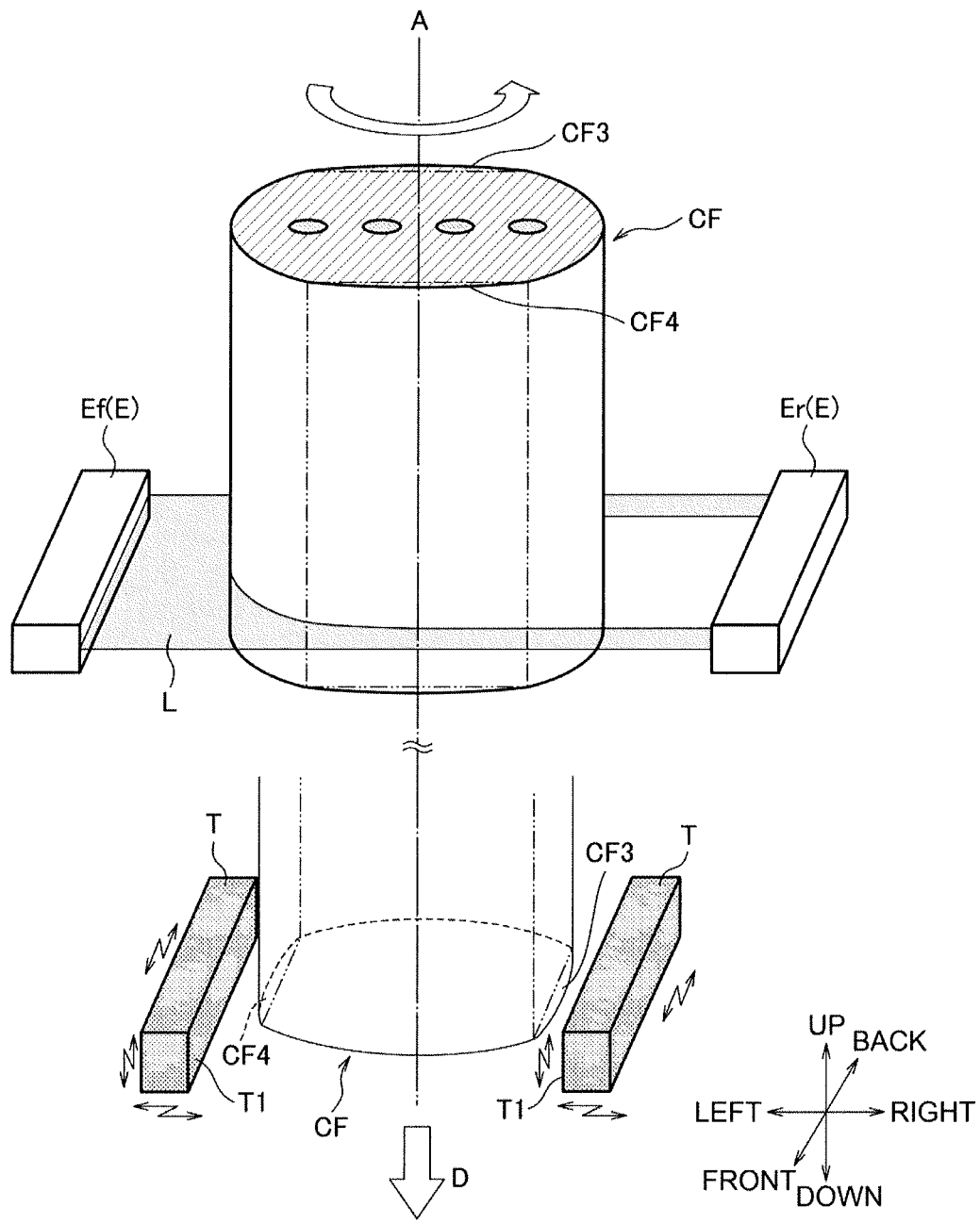
FIG. 4A is a schematic illustration showing an outline-detecting step in the first aspect of the production method.
Figure 4B:
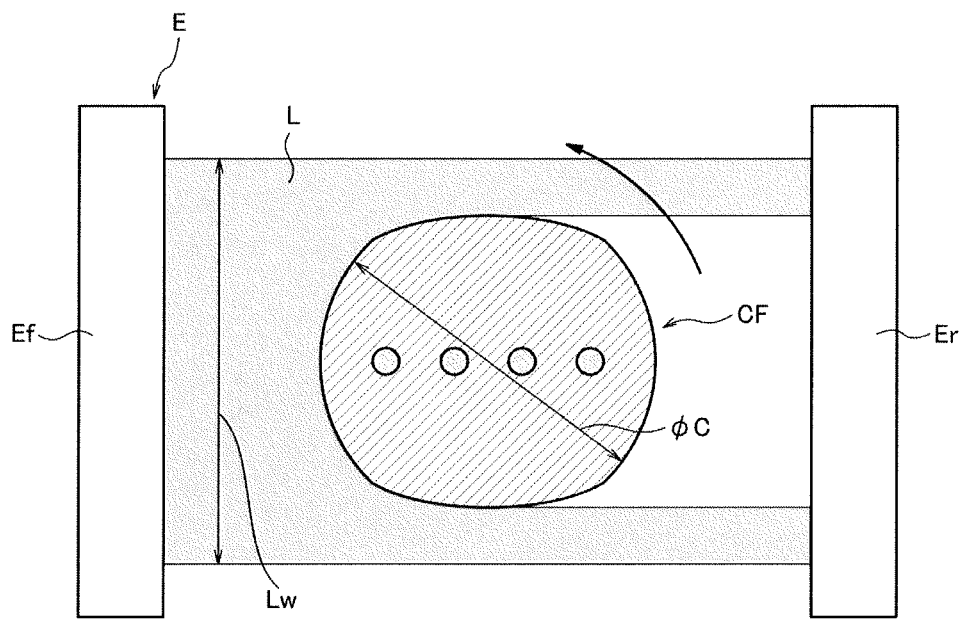
FIG. 4B is a schematic illustration showing the outline-detecting step in the first aspect of the production method.
Figure 4C:
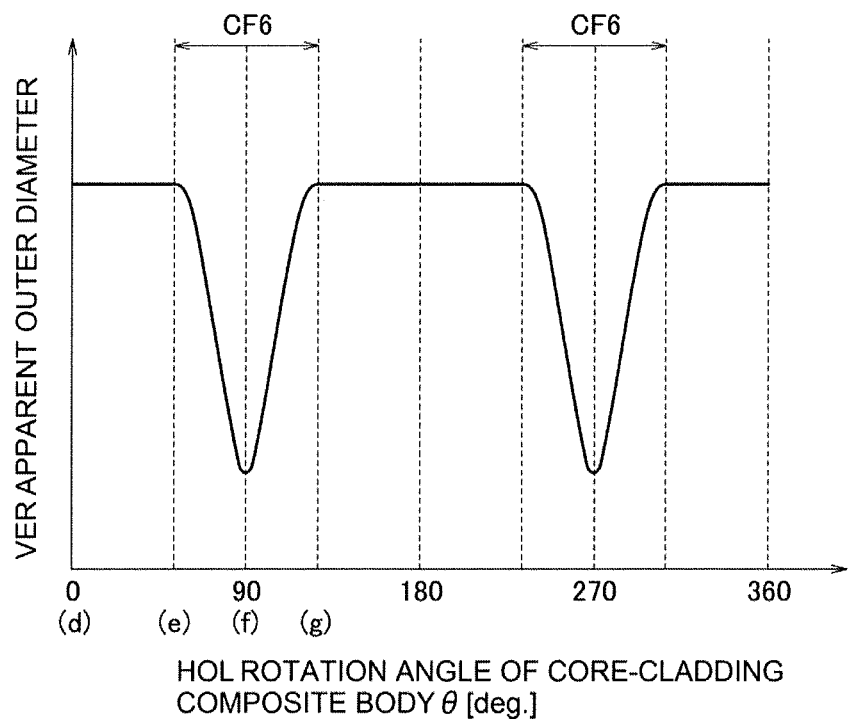
FIG. 4C is a graph showing signal intensity versus the rotation angle of a core-cladding composite body.
Figure 4D:
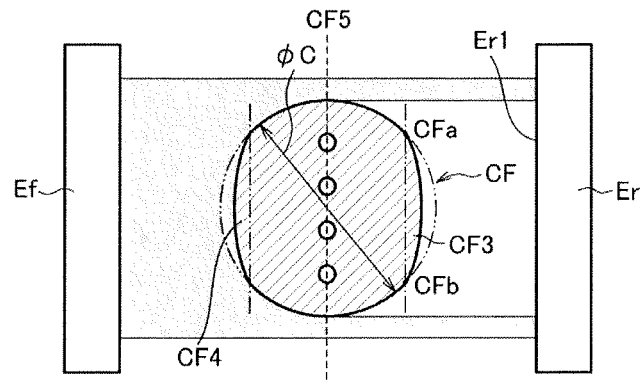
FIG. 4D is an illustration showing the position of the core-cladding composite body under irradiation with measuring light.

FIGS. 4A to 4G are schematic illustrations showing the outline-detecting step in the first aspect of the production method. As shown in FIGS. 4A and 4B, in the outline-detecting step S150, a detector E that optically detects the outline of an object is used to detect the outline of the core-cladding composite body CF. The detector E includes a projector Ef that emits inspection light L and a line sensor Er that is a light receiver for receiving light. The line sensor Er may be phototransistors, photodiodes, a CCD, or CMOSs or may include photosensors arranged in a line.

The projector Ef and the line sensor Er are disposed in the same horizontal plane, and the inspection light L emitted from the projector Ef spreads in this horizontal plane. As shown in FIG. 4B, the width Lw of the inspection light L is larger than the diameter φC of the circumcircle of the core-cladding composite body CF. In the outline-detecting step S150, the core-cladding composite body CF is lowered by a prescribed amount in its moving direction D (a vertically downward direction) and then rotated about its lengthwise axis A to detect the outline of the core-cladding composite body CF. In this case, the deformation of the core-cladding composite body CF in a direction perpendicular to the lengthwise axis A due to its own weight is smaller than that occurring when the moving direction D of the core-cladding composite body CF is the horizontal direction, so that the outline of the core-cladding composite body CF can be detected more appropriately.

Referring next to FIGS. 4B, 4C, and 4D to 4G, the principle of detecting the outline of the core-cladding composite body CF by the detector E in the first aspect of the production method will be described. For the sake of simplicity, in the following description, the state shown in FIG. 4D (the state in which a symmetry axis CF5 in the cross section of the core-cladding composite body CF, the cross section being perpendicular to the lengthwise axis A is parallel to a light receiving surface Er1 of the line sensor Er) is used as a reference position (θ=0 deg.).

Figure 4E:
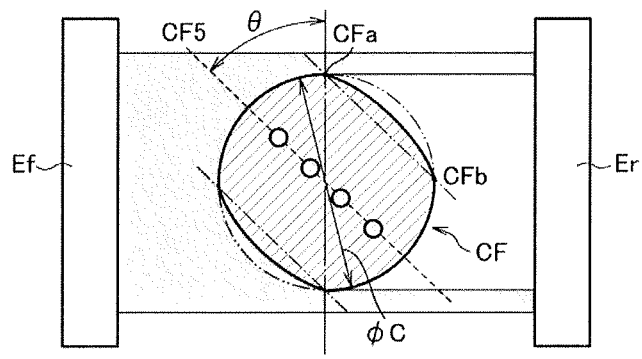
FIG. 4E is an illustration showing the position of the core-cladding composite body under irradiation with the measuring light.
Figure 4F:
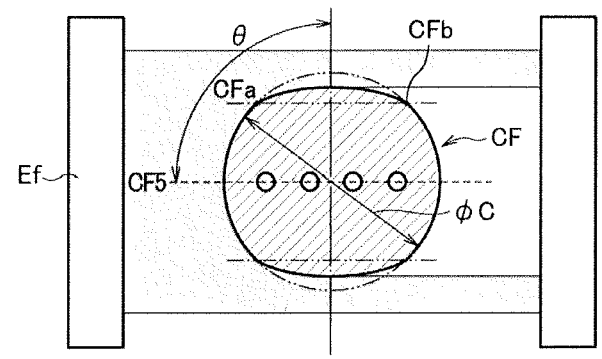
FIG. 4F is an illustration showing the position of the core-cladding composite body under irradiation with the measuring light.
Figure 4G:
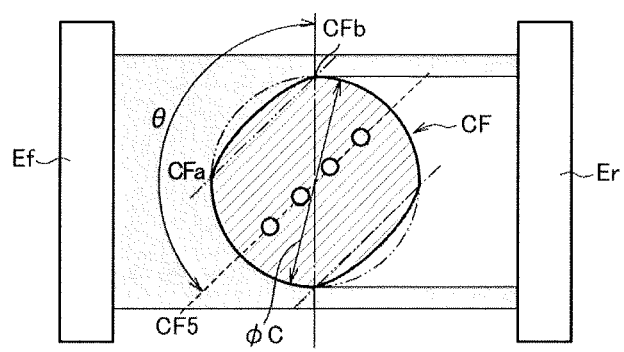
FIG. 4G is an illustration showing the position of the core-cladding composite body under irradiation with the measuring light.

During rotation of the core-cladding composite body CF from the reference position to the position shown in FIG. 4E (the position at which a point CFa where curvature is discontinuous casts a shadow), the outer circumference of the core-cladding composite body CF coincides with its circumcircle. In this case, an apparent outer diameter determined from a signal outputted from the line sensor Er is constant, i.e., equal to the diameter ϕC of the circumcircle ((d) (0 deg.) to (e) in FIG. 4C). During rotation of the core-cladding composite body CF from the position shown in FIG. 4E to the position shown in FIG. 4F (the position at θ=90 deg.), the outer circumference of the core-cladding composite body CF gradually deviates from the circumcircle. In this case, the apparent outer diameter determined from the signal outputted from the line sensor Er decreases ((e) to (f) (90 deg.) in FIG. 4C). During rotation of the core-cladding composite body CF from the position shown in FIG. 4F to the position shown in FIG. 4G (the position at which a point CFb where the curvature is discontinuous casts a shadow), the outer circumference of the core-cladding composite body CF gradually approaches the circumcircle. In this case, the apparent outer diameter determined from the signal outputted from the line sensor Er increases ((f) (90 deg.) to (g) in FIG. 4C). During rotation of the core-cladding composite body CF from the position shown in FIG. 4G to the position at θ=180 deg., the outer circumference of the core-cladding composite body CF coincides with the circumcircle. In this case, the apparent outer diameter determined from the signal outputted from the line sensor Er is constant, i.e., equal to the diameter ϕC of the circumcircle ((g) to 180 deg. in FIG. 4C). When θ is larger than 180 deg., the behavior of the apparent outer diameter of the core-cladding composite body CF is completely the same as that at θ=0 deg. to 180 deg. because the core-cladding composite body CF has the symmetry axes, and the description thereof will be omitted.

When the core-cladding composite body CF is rotated one turn from the reference position as described above, the correspondence relation shown in FIG. 4C is obtained. Angular ranges corresponding to regions in which the apparent outer diameter is not constant (e.g., the section from (e) to (g) in the range of θ=0 deg. to 180 deg.) (these ranges are referred to as protruding regions CF6) are stored.

As shown in FIG. 4A, in the optical fiber preform forming step S160, the symmetry axis CF5 of the core-cladding composite body CF is identified based on the results of detection of the outline of the core-cladding composite body CF detected by the detector E (based on the angular ranges corresponding to the protruding regions CF6), and the core-cladding composite body CF is rotated until the symmetry axis CF5 is parallel to tool surfaces T1 of machining tools T. Then the core-cladding composite body CF is moved in its moving direction D and lowered to the positions of the machining tools T. The machining tools T are, for example, grinding tools. At least one machining tool T is provided directly below the detector E so as to be movable in all directions including frontward-backward, left-right, and upward-downward directions. The core-cladding composite body CF is ground to positions spaced a prescribed distance from the symmetry axis CF5 to mechanically remove the upper protruding portion CF3 and the lower protruding portion CF4. An upper flat surface MF1 and a lower flat surface MF2 are thereby formed.

When the MCF 100B is formed, a core arrangement axis X4 (see FIG. 3E) of a core-cladding composite body CF is identified based on the results of detection of the outline of the core-cladding composite body CF, and the core-cladding composite body CF is rotated until the core arrangement axis X4 is parallel to the tool surface T1 of one of the machining tools T. Then the core-cladding composite body CF is ground to a position spaced a prescribed distance from the core arrangement axis X4 to mechanically remove an upper ridge portion DF1. An upper flat surface MF1 is thereby formed.

Finally, in a drawing step S170, one end of the multicore optical fiber preform MF is drawn into a fiber under heating. In this manner, the MCFs 100A, 100B, 100C, and 100D shown in FIGS. 1A to 1D are produced.

The Second Aspect of the Multicore Optical Fiber Production Method

Figure 5:
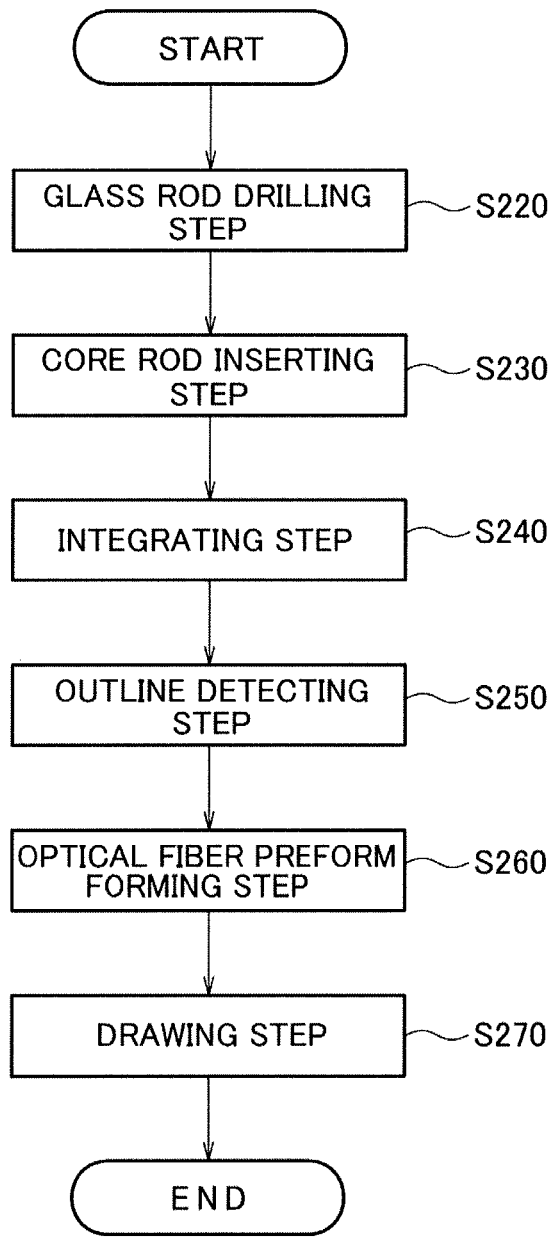
FIG. 5 is a flowchart showing the second aspect of the multicore optical fiber production method of the present invention.
Figure 6A:
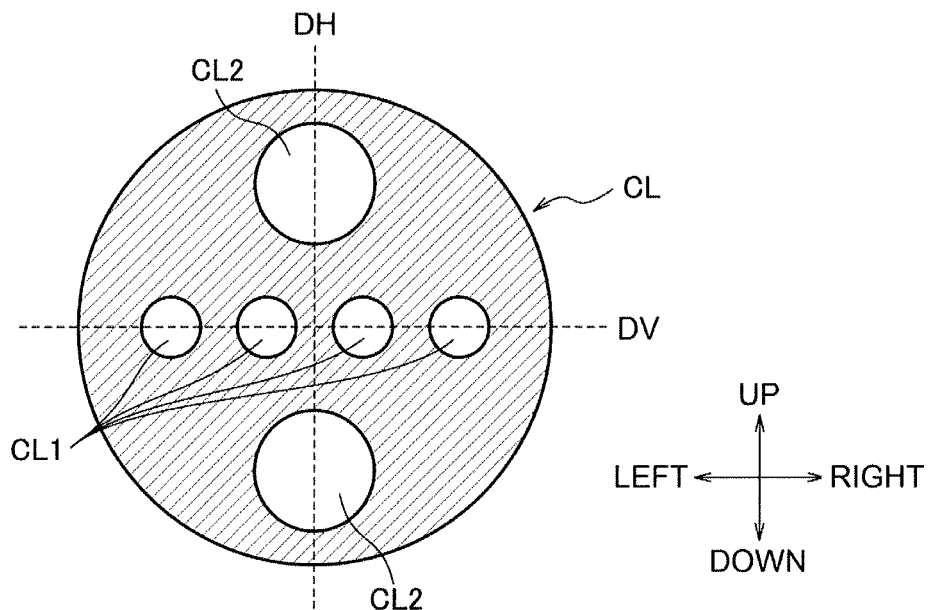
FIG. 6A is an illustration showing the cross-sectional shape of a member in the second aspect of the production method.
Figure 6B:
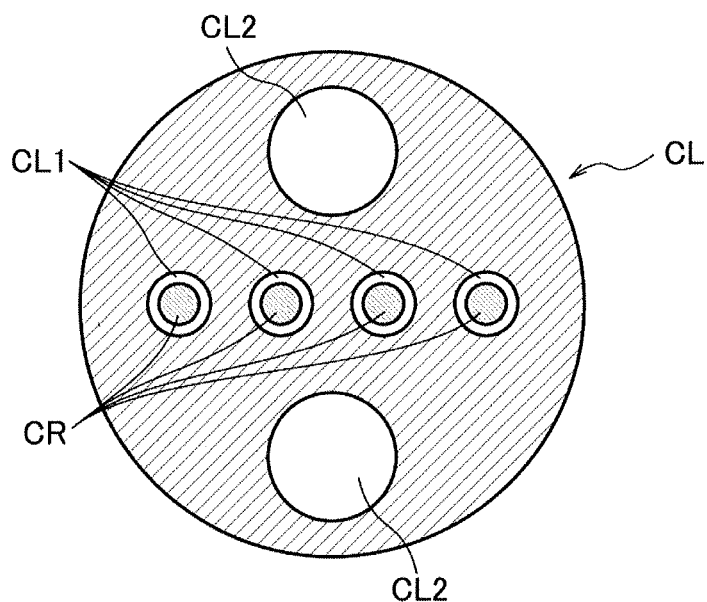
FIG. 6B is an illustration showing the cross-sectional shape of the member in the second aspect of the production method.
Figure 6C:
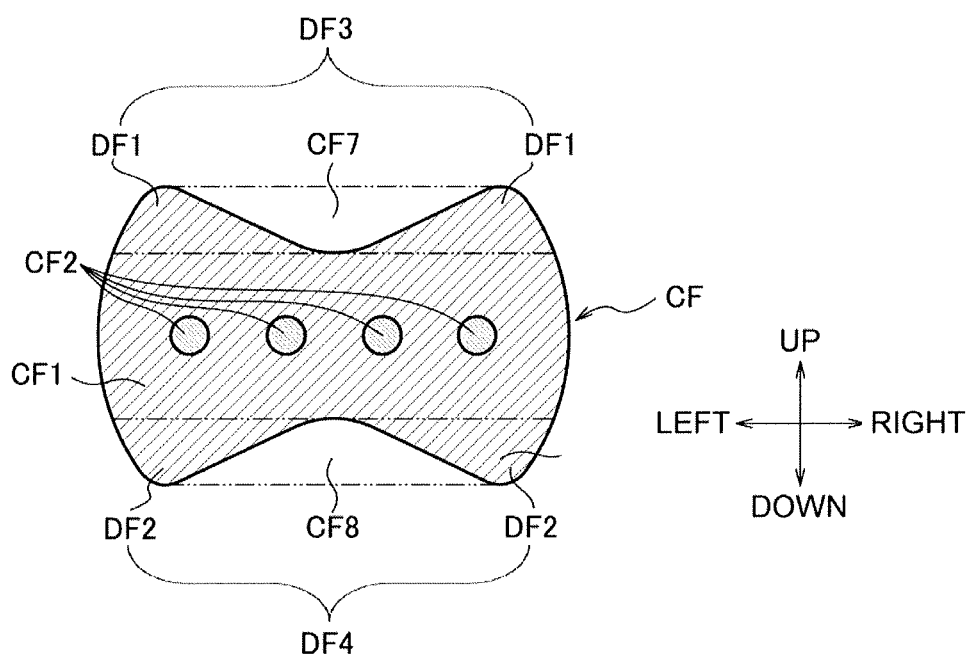
FIG. 6C is an illustration showing the cross-sectional shape of the member in the second aspect of the production method.

FIG. 5 is a flowchart showing the second aspect of the multicore optical fiber production method. FIGS. 6A, 6B, and 6C are cross-sectional views showing a member in different steps of the second aspect of the production method.

In the second aspect of the production method, a glass rod G having a circular cross-sectional shape is prepared in advance. Then, in a glass rod-drilling step S220, a plurality of core rod insertion holes CL1 having a circular cross-sectional shape and extending in the longitudinal direction of the glass rod G are formed on a diameter line DV of the glass rod G (a common cladding tube CL) in a cross section perpendicular to its center axis. The formation positions of the core rod insertion holes CL1 are the same as those in the first aspect of the production method, and the description thereof will be omitted. Then concave portion formation holes CL2 having a circular cross-sectional shape and a diameter larger than the diameter of the core rod insertion holes CL1 are formed on a diameter line DH perpendicular to the diameter line DV at positions different from the core rod insertion holes CL1. In FIG. 6A, the number of concave portion formation holes CL2 is two but is not limited to two.

When the MCFs 100A, 100C, and 100D are formed, the concave portion formation holes CL2 are formed so as to be line-symmetric with respect to the diameter line DV. When the MCF 100B is formed, a concave portion formation hole CL2 is formed only on one side of the diameter line DV.

Next, in a core rod inserting step S230, core rods CR are inserted into the respective core rod insertion holes CL1 to obtain the state shown in FIG. 6B. The diameter of the core rods CR is smaller than the diameter of the core rod insertion holes CL1.

Next, in an integrating step S240, the common cladding tube CL with the core rods CR inserted therein is heated to integrate the core rods CR with the common cladding tube CL, and the concave portion formation holes CL2 are collapsed to form an upper protruding portion DF3 including upper ridge portions DF1 and an upper recess CF7 and a lower protruding portion DF4 including lower ridge portions DF2 and a lower recess DF8. A core-cladding composite body CF shown in FIG. 6C is thereby produced. The core-cladding composite body CF includes a common cladding CF1 and cores CF2 and has a noncircular cross section.

Figure 7A:
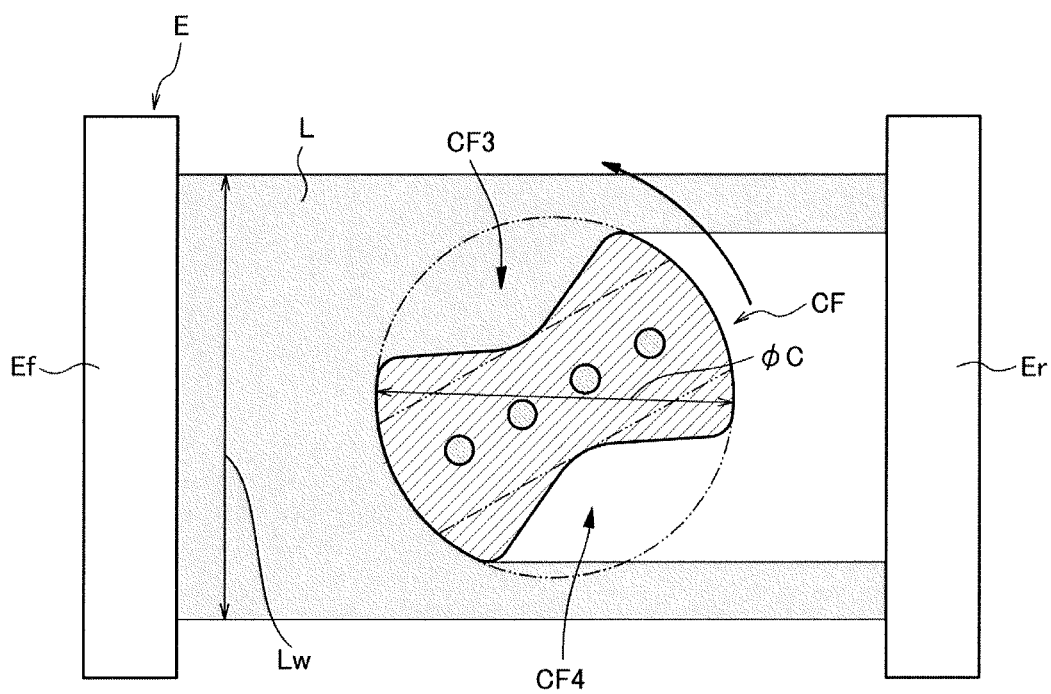
FIG. 7A is a schematic illustration showing an outline-detecting step in the second aspect of the production method.
Figure 7B:
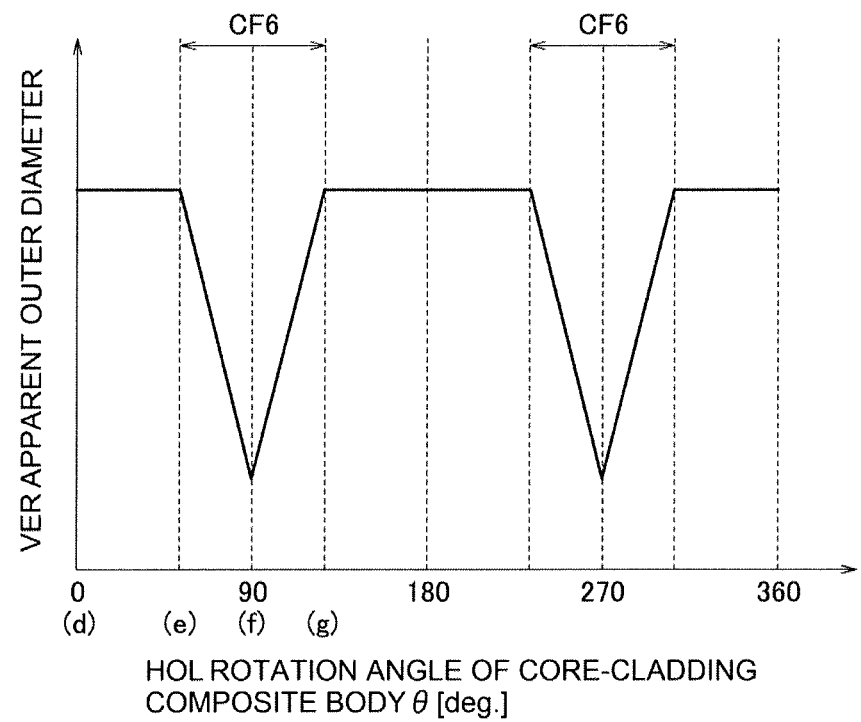
FIG. 7B is a graph showing signal intensity versus the rotation angle of a core-cladding composite body.
Figure 7C:
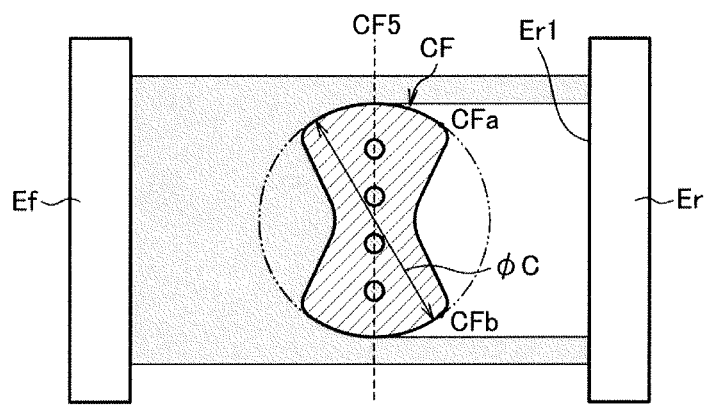
FIG. 7C is an illustration showing the position of the core-cladding composite body under irradiation with measuring light.

Next, in an outline detecting step S250 and an optical fiber preform forming step S260, the outer circumferential surface of the core-cladding composite body CF is machined to produce the multicore optical fiber preform MF shown in FIG. 3F. In the outline-detecting step S250, the detector E shown in FIG. 4A is used to optically detect the outline of the core-cladding composite body CF. FIGS. 7A to 7F are schematic illustrations showing the outline-detecting step in the second aspect of the production method. As shown in FIG. 7A, in the second aspect of the production method also, the width Lw of the inspection light L is larger than the diameter φC of the circumcircle of the core-cladding composite body CF. For the sake of simplicity, in the following description, the state shown in FIG. 7C (the state in which a symmetry axis CF5 that does not intersect the upper protruding portion DF3 and the lower protruding portion DF4 of the core-cladding composite body CF is parallel to the light receiving surface Er1 of the line sensor Er) is used as a reference position (θ=0 deg.).

Figure 7D:
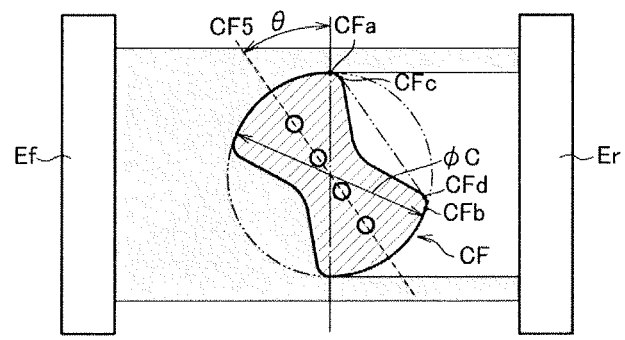
FIG. 7D is an illustration showing the position of the core-cladding composite body under irradiation with the measuring light.
Figure 7E:
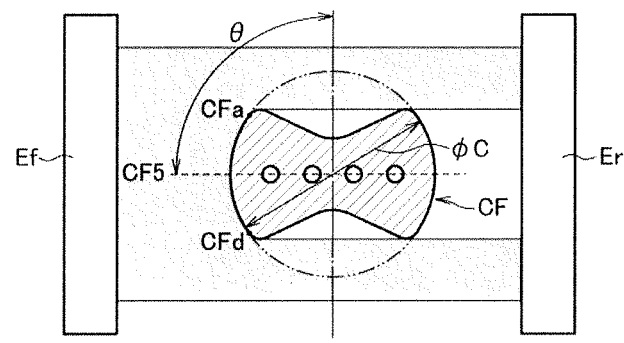
FIG. 7E is an illustration showing the position of the core-cladding composite body under irradiation with the measuring light.
Figure 7F:
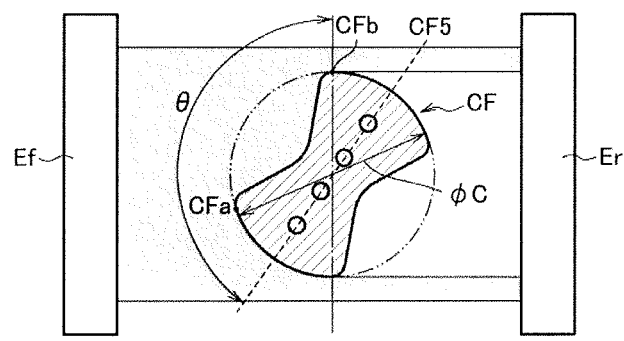
FIG. 7F is an illustration showing the position of the core-cladding composite body under irradiation with the measuring light.

During rotation of the core-cladding composite body CF from the reference position to the position shown in FIG. 7D (the position at which a point CFa casts a shadow), the outer circumference of the core-cladding composite body CF coincides with its circumcircle. The apparent outer diameter determined from the signal outputted from the line sensor Er is constant, i.e., equal to the diameter φC of the circumcircle ((d) (0 deg.) to (e) in FIG. 7B). During rotation of the core-cladding composite body CF from the position shown in FIG. 7D to the position show in FIG. 7E (the position at θ=90 deg.), the outer circumference of the core-cladding composite body CF is located on the center side of a straight line connecting apexes CFc and CFd. In this case, the apparent outer diameter determined from the signal outputted from the line sensor Er decreases monotonically ((e) to (f) (90 deg.) in FIG. 7B). During rotation of the core-cladding composite body CF from the position shown in FIG. 7E to the position shown in FIG. 7F (the position at which a point CFb casts a shadow), the outer circumference of the core-cladding composite body CF is located on the center side of the straight line connecting the apexes CFc and CFd. In this case, the apparent outer diameter determined from the signal outputted from the line sensor Er increases monotonically ((f) (90 deg.) to (g) in FIG. 7B). During rotation of the core-cladding composite body CF from the position shown in FIG. 7F to the position at θ=180 deg., the outer circumference of the core-cladding composite body CF coincides with the circumcircle. In this case, the apparent outer diameter determined from the signal outputted from the line sensor Er is constant, i.e., equal to the diameter φC of the circumcircle ((g) to 180 deg. in FIG. 7B). When θ is larger than 180 deg., the behavior of the apparent outer diameter of the core-cladding composite body CF is completely the same as that at θ=0 deg. to 180 deg. because the core-cladding composite body CF has the symmetry axes, and the description thereof will be omitted.

When the core-cladding composite body CF is rotated one turn from the reference position as described above, the correspondence relation shown in FIG. 7B is obtained. Angular ranges corresponding to regions in which the apparent outer diameter is not constant (e.g., the section from (e) to (g) in the range of θ=0 deg. to 180 deg.) (these ranges are referred to as protruding regions CF6) are stored.

In the optical fiber preform forming step S260, as in the first aspect of the production method, while the core-cladding composite body CF is moved in the moving direction D in the same manner as in the optical fiber preform forming step S160, the outer circumferential surface of the core-cladding composite body CF is machined using the machining tools T based on the results of detection of the outline of the core-cladding composite body CF detected by the detector E to produce the multicore optical fiber preform MF shown in FIG. 3F. Finally, in a drawing step S270, one end of the multicore optical fiber preform MF is drawn into a fiber under heating. In this manner, the MCFs 100A, 100B, 100C, and 100D shown in FIGS. 1A to 1D are produced.

As described above, in the first and second aspects of the production method of the present invention, since the core-cladding composite body CF has a noncircular cross-sectional shape, the positions of the cores CF2 can be estimated by detecting the outline of the core-cladding composite body CF. Therefore, variations in the positions of the cores CF2 relative to the outer shape of the MCF are reduced, and the rotational alignment can be performed with respect to the flat surface(s) 121, so that the rotational alignment operation for the MCFs 100A, 100B, 100C, and 100D produced can be performed easily. In the outline detecting steps S150 and S250, since the outline of the core-cladding composite body CF is detected optically without contact with the core-cladding composite body CF, it is possible to reduce the probability that the core-cladding composite body CF is scratched. In the glass rod drilling steps S120 and S220, the plurality of core rod insertion holes CL1 are formed such that the arrangement of the plurality of core rod insertion holes CL1 has line symmetry. In this case, since the axis of line symmetry (e.g., the diameter line DV) is parallel to the flat surfaces (CL3 and CL4), the flat surface(s) 121 is (are) parallel to the arrangement direction of the cores 111. Therefore, the rotation alignment operation can be easily performed for MCFs produced from different glass rods.

Since the first aspect of the production method includes the glass rod machining step S110 of machining the outer circumferential surface of the glass rod MG having a circular cross-sectional shape to form the flat surfaces (GF1 and GF2), the glass rod G is machined to have a noncircular cross section before the core rods Cr are inserted, and therefore the amount of machining in the optical fiber preform forming step S160 can be reduced. In the glass rod-drilling step S220 in the second aspect of the production method, the plurality of core rod insertion holes CL1 are formed, and then the concave portion formation holes CL2 are formed at positions different from the positions of the plurality of core rod insertion holes CL1. In the integrating step, the concave portion formation holes CL2 are collapsed, and therefore the noncircular cross-sectional shape of the core-cladding composite body CF can be obtained using the simple operation.

MCFs in Embodiments of the Present Invention

Figure 8A:
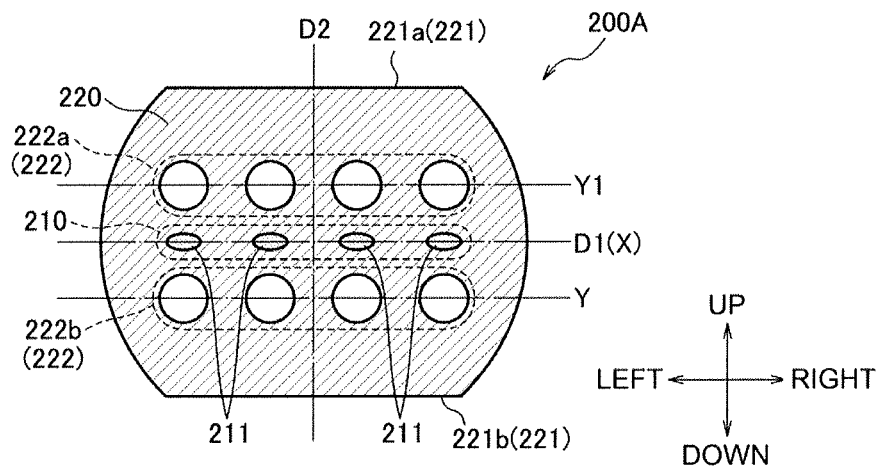
FIG. 8A is an illustration showing an example of the cross-sectional shape of a MCF in an embodiment of the present invention.
Figure 8B:
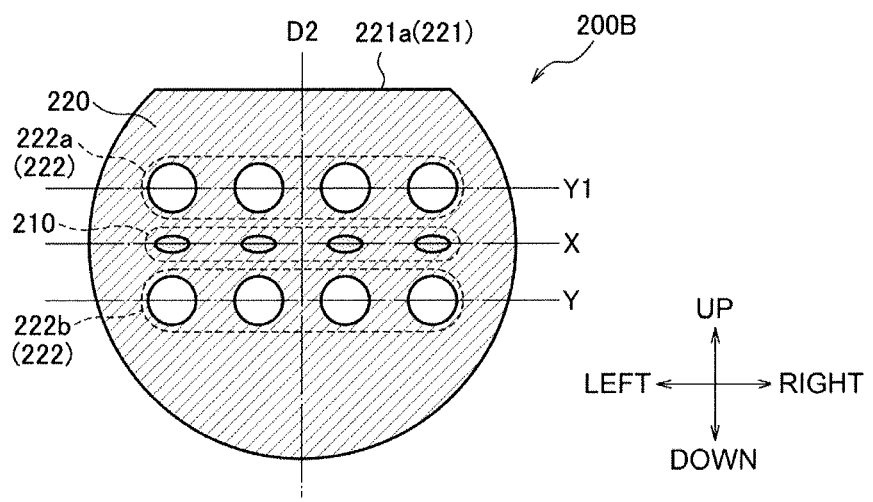
FIG. 8B is an illustration showing another example of the cross-sectional shape of the MCF in the embodiment of the present invention.
Figure 8C:
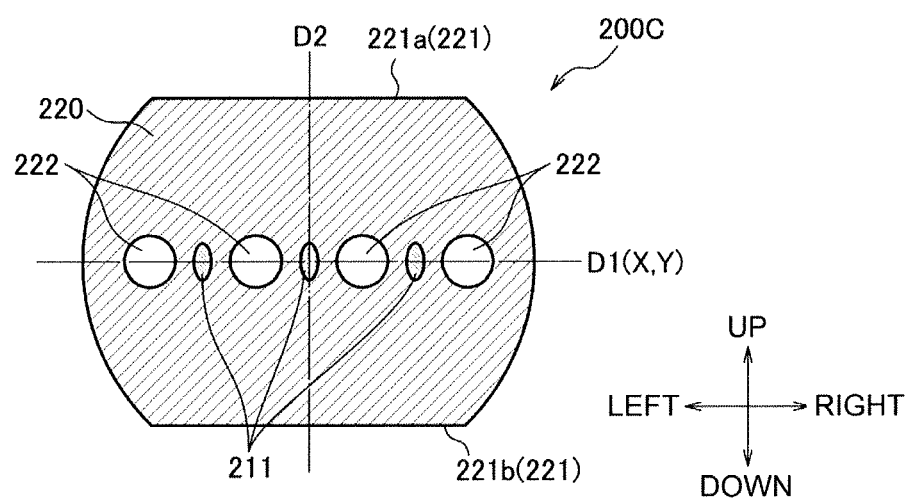
FIG. 8C is an illustration showing another example of the cross-sectional shape of the MCF in the embodiment of the present invention.

FIGS. 8A, 8B, and 8C are illustrations showing examples of cross-sectional shapes of multicore optical fibers (MCFs) 200A, 200B, and 200C in embodiments of the present invention. Each of the MCFs 200A, 200B, and 200C is made of glass and includes: a core group 210 including a plurality of cores 211 extending in the longitudinal direction of the MCF and serving as optical waveguides; and a common cladding 220 that covers the core group 210. The plurality of cores 211 are disposed on an axis (a core arrangement axis X) in a cross section perpendicular to the lengthwise axis of the optical fiber. Each MCF has a flat surface(s) 221 formed by partially flattening the common cladding 220. Each flat surface 221 functions as a reference surface used when MCFs are connected together. A plurality of holes 222 are formed in the common cladding 220.

The common cladding 220 of the MCF 200A shown in FIG. 8A has, in its cross section perpendicular to the lengthwise axis of the optical fiber, a symmetry axis D1 extending along the core arrangement axis X and a symmetry axis D2 perpendicular to the core arrangement axis X. The common cladding 220 has, as the flat surfaces 221, an upper flat surface 221a and a lower flat surface 221b that are parallel to the symmetry axis D1. The common cladding 220 further has the holes 222 (upper holes 222a and lower holes 222b) disposed on hole arrangement axes Y1 and Y2 parallel to the symmetry axis D1. The hole arrangement axes Y1 and Y2 are disposed so as to be line-symmetric with respect to the symmetry axis D1. Therefore, the holes 222 are line-symmetric with respect to the symmetry axis D1 and to the symmetry axis D2 extending in the vertical direction.

The cores 211 of the MCF 200A have an elliptic cross-sectional shape and are disposed in the common cladding 220 at regular intervals on the core arrangement axis X extending in the left-right direction. The core group 210 is positioned at the center in the vertical direction of the MCF 200A and at the center in the left-right direction of the MCF 200A. Therefore, the core arrangement axis X coincides with the symmetry axis D1 of the common cladding 220 and is orthogonal to the symmetry axis D2 of the common cladding 220. In other words, the core arrangement axis X is parallel to the upper flat surface 221a, and the upper flat surface 221a and the lower flat surface 221b are line-symmetric with respect to the core arrangement axis X. That is, the upper holes 222a and the lower holes 222b that have the same shape are formed at symmetric positions with the plurality of cores 211 therebetween.

The common cladding 220 of the MCF 200B shown in FIG. 8B is line-symmetric with respect to a symmetry axis D2 orthogonal to the core arrangement axis X in a cross section perpendicular to the lengthwise axis of the optical fiber. The common cladding 220 has, as the flat surface 221, an upper flat surface 221a orthogonal to the symmetry axis D2. The common cladding 220 further has the holes 222 (upper holes 222a and lower holes 222b) disposed parallel to the upper flat surface 221a. The upper holes 222a are disposed on a hole arrangement axis Y1, and the lower holes 222b are disposed on a hole arrangement axis Y2. The hole arrangement axes Y1 and Y2 are disposed so as to be line-symmetric with respect to the core arrangement axis X. Therefore, the holes 222 are line-symmetric with respect to the core arrangement axis X and the symmetry axis D2.

The cores 211 of the MCF 200B have an elliptic cross-sectional shape and are disposed in the common cladding 220 at regular intervals on the core arrangement axis X extending in the left-right direction. The core group 210 is positioned at the center in the vertical direction of the MCF 200B and at the center in the left-right direction of the MCF 200B. Therefore, the core arrangement axis X is orthogonal to the symmetry axis D2 of the common cladding 220. In other words, the core arrangement axis X is parallel to the upper flat surface 221a. The upper holes 222a and the lower holes 222b that have the same shape are formed at symmetric positions with the plurality of cores 211 therebetween.

The common cladding 220 of the MCF 200C shown in FIG. 8C has, in its cross section perpendicular to the lengthwise axis of the optical fiber, a symmetry axis D1 extending along the core arrangement axis X and a symmetry axis D2 perpendicular to the core arrangement axis X. The common cladding 220 has, as the flat surfaces 221 parallel to the symmetry axis D1, an upper flat surface 221a and a lower flat surface 221b that are parallel to each other. The common cladding 220 has the holes 222 arranged at regular intervals on a hole arrangement axis Y that coincides with the symmetry axis D1. Therefore, the holes 222 are line-symmetric with respect to the symmetry axis D1 and the symmetry axis D2.

The cores 211 of the MCF 200C have an elliptic cross-sectional shape and are disposed in the common cladding 220 at regular intervals on the core arrangement axis X extending in the left-right direction. Each core 211 is disposed between adjacent holes 222. The core group 210 is positioned at the center in the vertical direction of the MCF 200C and at the center in the left-right direction of the MCF 200C. Therefore, the core arrangement axis X coincides with the symmetry axis D1 and the hole arrangement axis Y of the common cladding 220 and is orthogonal to the symmetry axis D2 of the common cladding 220. In other words, the core arrangement axis X is parallel to the upper flat surface 221a, and the upper flat surface 221a and the lower flat surface 221b are line-symmetric with respect to the core arrangement axis X.

Method for Producing MCFs 200A, 200B, and 200C

Figure 9:
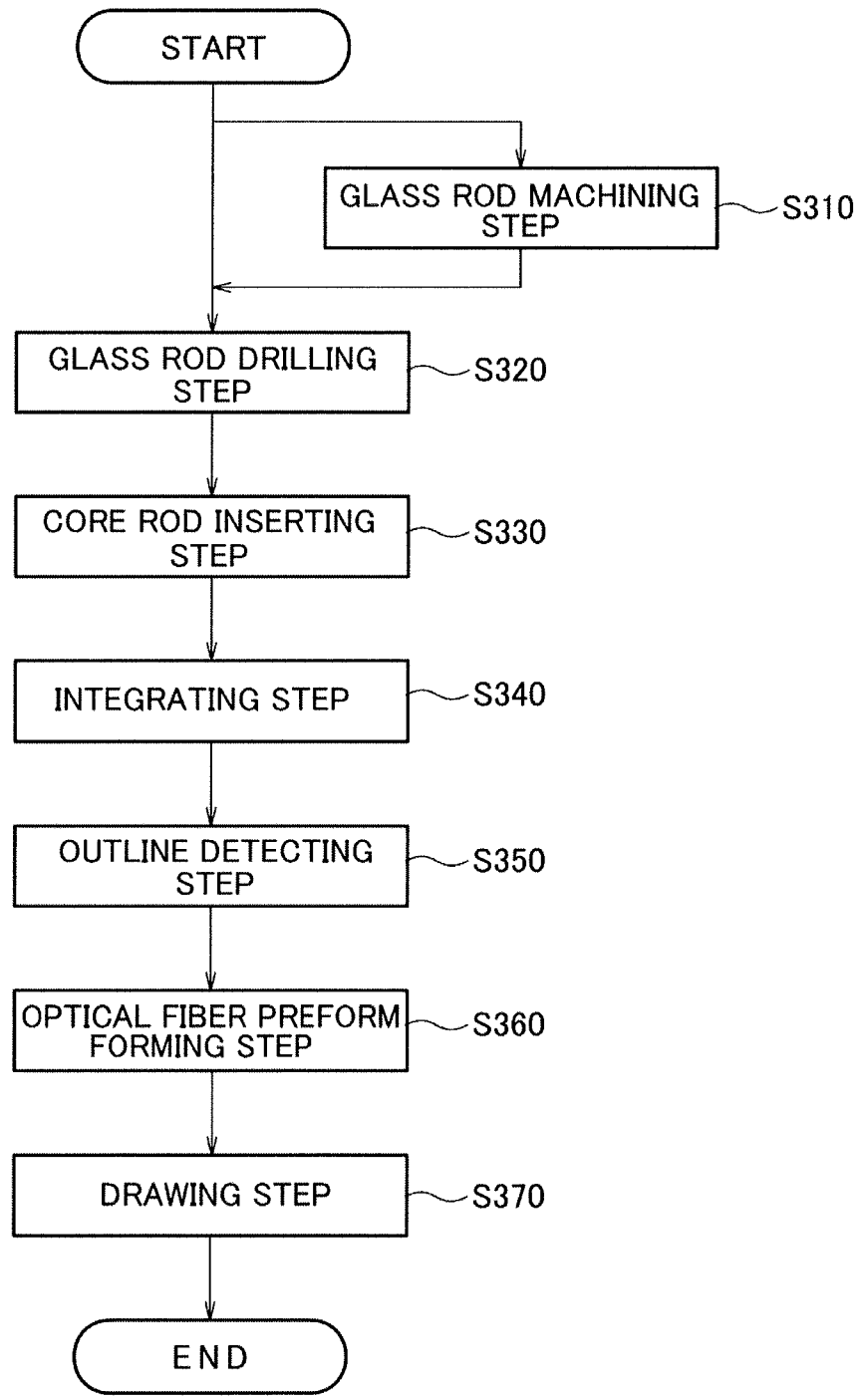
FIG. 9 is a flowchart showing an embodiment of a method for producing the MCF of the present invention.
Figure 10A:
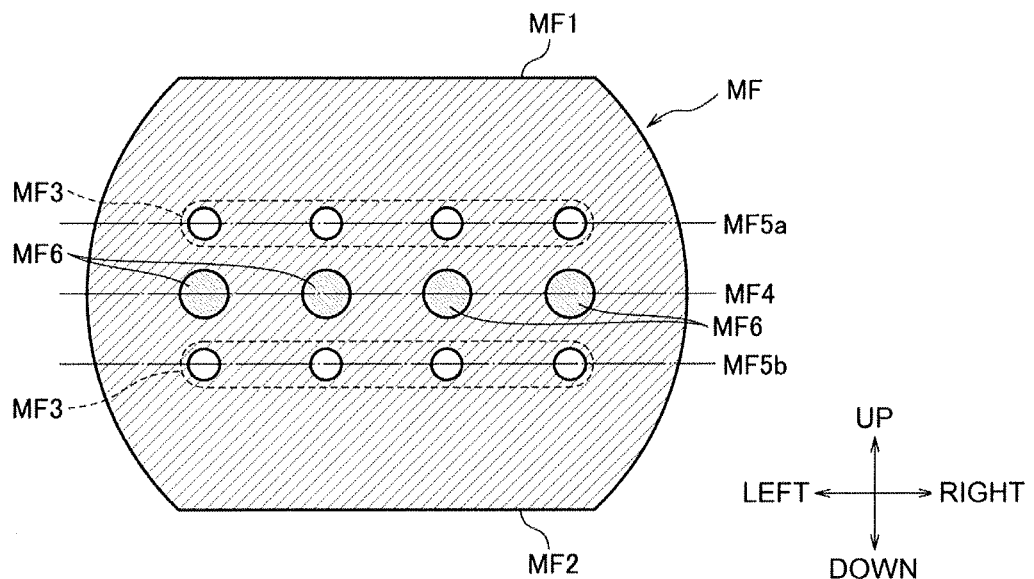
FIG. 10A is an illustration showing the cross-sectional shape of a member in steps in the method for producing the MCF of the present invention.
Figure 10B:
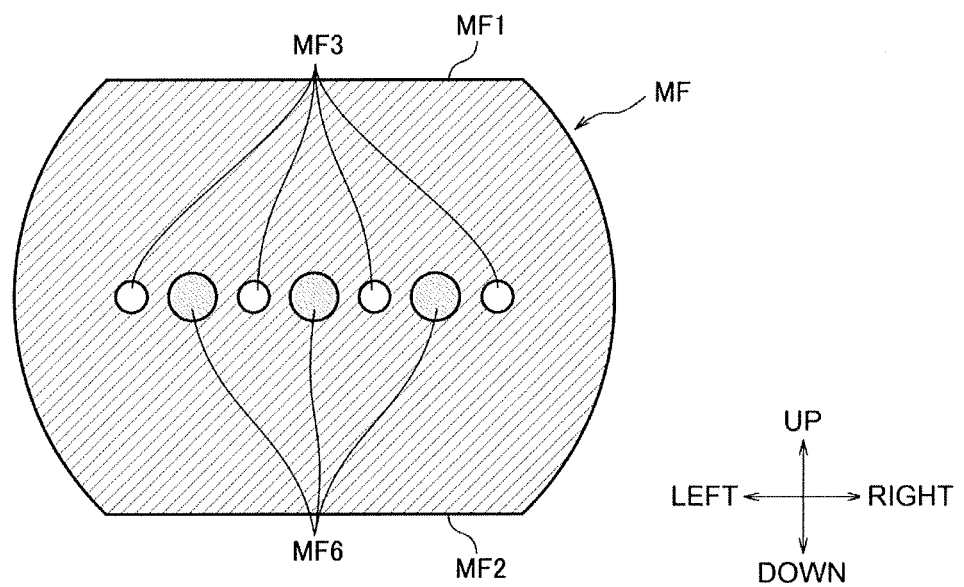
FIG. 10B is an illustration showing the cross-sectional shape of a member in steps in the method for producing the MCF of the present invention.

FIG. 9 is a flowchart showing a method for producing the MCFs 200A, 200B, and 200C, and FIGS. 10A and 10B are illustrations showing cross-sectional shapes of members in a step of the multicore optical fiber production method in an embodiment.

A glass-machining step S310 is the same as the glass rod-machining step S110. A glass rod-drilling step S320 is the same as the glass rod-drilling step S120 or the glass rod-drilling step S220. A core rod-inserting step S330 is the same as the core rod-inserting step S130 or the core rod-inserting step S230. An integrating step S340 is the same as the integrating step S140 or the integrating step S240. An outline-detecting step S350 is the same as the outline-detecting step S150 or the outline-detecting step S250.

In an optical fiber preform forming step S360, the same procedure as in the optical fiber preform forming step S160 or the optical fiber preform forming step S260 is repeated until the flat surfaces MF1 and MF2 are formed. Then core deformation holes MF3 are formed. When the cross-sectional shape of the MCF 200A or 200B is formed, the core deformation holes MF3 are formed at regular intervals on parallel axes MF5a and MF5b spaced a certain distance from a center axis MF4 with respect to the vertical direction. In this case, each vertical pair of core deformation holes MF3 is formed so as to be vertically symmetric with respect to a corresponding one of the cores MF6. When the cross-sectional shape of the MCF 200C is formed, the core deformation holes MF3 are formed on the center axis MF4 with respect to the vertical direction. In this case, the core deformation holes MF3 are formed such that each adjacent pair of them are disposed on the left and right sides of a corresponding one of the cores MF6 as shown in FIG. 10B.

Finally, in a drawing step S370, one end of the multicore optical fiber preform MF is drawn into a fiber under heating. In this manner, the MCFs 200A, 200B, and 200C shown in FIGS. 8A to 8C are produced. In this case, it is preferable that pressure is applied to the core deformation holes MF3 to expand the core deformation holes MF3 in the multicore optical fiber preform MF (such that the diameter of the holes 222 relative to the outer diameter of the MCFs 200A, 200B, and 200C is larger than the diameter of the core deformation holes MF3 relative to the outer diameter of the multicore optical fiber preform MF).

In the method for producing the MCFs 200A, 200B, and 200C, the core rod insertion holes CL1 have a circular cross-sectional shape. In the optical fiber preform-forming step S360, the core deformation holes having the same shape are formed such that each of the cores MF6 is located between corresponding two of the core deformation holes, the two of the core deformation holes being disposed at positions symmetric with respect to the each of the cores MF6. Therefore, in the drawing step S370, the cores MF6 are compressed and deformed so as to have a noncircular cross-sectional shape. The cores 211 of the MCFs 200A, 200B, and 200C produced can maintain the state of polarization of light. Each of the thus-obtained MCFs 200A, 200B, and 200C has the flat surface(s) 221. Therefore, the rotation alignment operation can be performed easily. Moreover, since the cores 211 have an elliptic cross-sectional shape, the cores 211 can maintain the state of polarization of light.

Modifications

Although the embodiments of the present invention have been described, the present invention is not limited to these embodiments. In the outline-detecting step in the embodiments of the present invention, the outline of the core-cladding composite body is detected optically. However, a probe may be brought into contact with the core-cladding composite body to detect the outer circumference of the core-cladding composite body. In the embodiments of the present invention, the machining by the machining tools is grinding but may be cutting. In the embodiments of the present invention, the detector is the device including the projector and the line sensor but may be an optical distance sensor. In the outline-detecting step and the optical fiber preform-forming step, the moving direction D of the core-cladding composite body CF is a vertically downward direction but may be a horizontal direction.

What is claimed is:

1. A method for producing a multicore optical fiber including a plurality of cores extending in a longitudinal direction of the multicore optical fiber and a common cladding that covers each of the plurality of cores, the method comprising:
    a glass rod machining step of machining an outer circumferential surface of a glass rod having a circular cross-sectional shape to form a flat surface;
    a glass rod drilling step of forming a plurality of core rod insertion holes extending in the longitudinal direction in the glass rod having the flat surface to produce a common cladding tube;
    a core rod inserting step of inserting core rods that are to become the plurality of cores into the respective plurality of core rod insertion holes;
    an integrating step of heating the common cladding tube and the core rods and integrating the common cladding tube with the core rods to form a core-cladding composite body having a noncircular cross-sectional shape and including the plurality of cores and the common cladding;
    an outline detecting step of detecting an outline of the core-cladding composite body;
    an optical fiber preform forming step of machining an outer circumferential surface of the core-cladding composite body using results obtained in the outline detecting step to form an optical fiber preform having a flat surface; and
    a drawing step of drawing one end of the optical fiber preform under heating to obtain the multicore optical fiber.

2. The method for producing a multicore optical fiber according to claim 1,
    wherein, in the glass rod drilling step, a cross section of the common cladding tube including the plurality of core rod insertion holes has line symmetry, the cross section being perpendicular to the longitudinal direction.

3. The method for producing a multicore optical fiber according to claim 1,
    wherein, in the outline detecting step, the outline of the core-cladding composite body is detected optically.

4. The method for producing a multicore optical fiber according to claim 1,
    wherein, in the optical fiber preform forming step, core deformation holes having the same shape are formed such that each of the plurality of cores is located between corresponding two of the core deformation holes, the two of the core deformation holes being disposed at positions symmetric with respect to the each of the plurality of cores.

5. A method for producing a multicore optical fiber including a plurality of cores extending in a longitudinal direction of the multicore optical fiber and a common cladding that covers each of the plurality of cores, the method comprising:
    a glass rod drilling step of forming a plurality of core rod insertion holes extending in the longitudinal direction in a glass rod having a circular cross-sectional shape and forming a concave portion formation hole at a position different from positions of the plurality of core rod insertion holes to form a common cladding tube;
    a core rod inserting step of inserting core rods that are to become the plurality of cores into the respective plurality of core rod insertion holes;
    an integrating step of heating the common cladding tube and the core rods and integrating the common cladding tube with the core rods and collapsing the concave portion formation hole to form a core-cladding composite body having a noncircular cross-sectional shape and including the plurality of cores and the common cladding;
    an outline detecting step of detecting an outline of the core-cladding composite body;
    an optical fiber preform forming step of machining an outer circumferential surface of the core-cladding composite body using results obtained in the outline detecting step to form an optical fiber preform having a flat surface; and
    a drawing step of drawing one end of the optical fiber preform under heating to obtain the multicore optical fiber.

6. The method for producing a multicore optical fiber according to claim 5,
    wherein, in the outline detecting step, the outline of the core-cladding composite body is detected optically.

7. The method for producing a multicore optical fiber according to claims 5,
    wherein, in the optical fiber preform forming step, core deformation holes having the same shape are formed such that each of the plurality of cores is located between corresponding two of the core deformation holes, the two of the core deformation holes being disposed at positions symmetric with respect to the each of the plurality of cores.

* * * * *